Patented Oct. 8, 1935

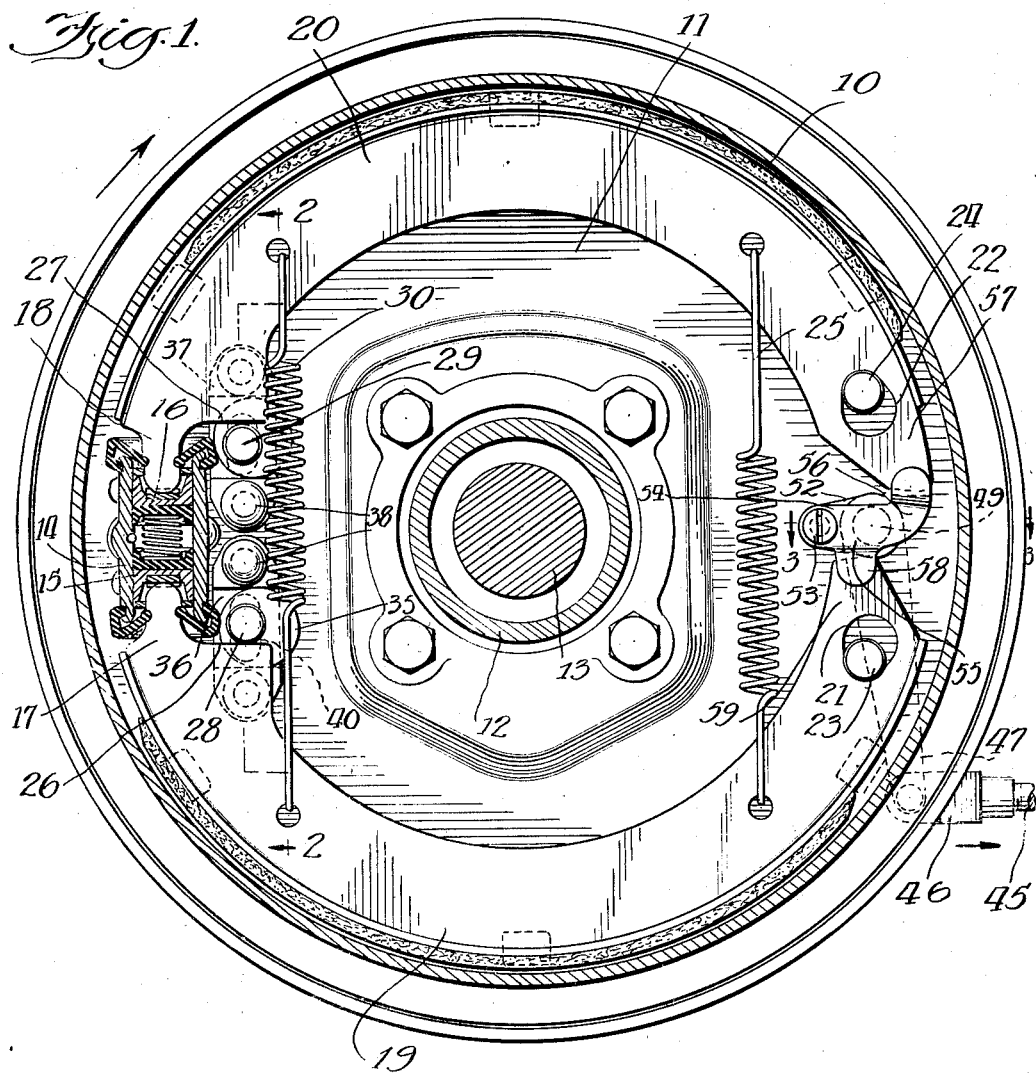

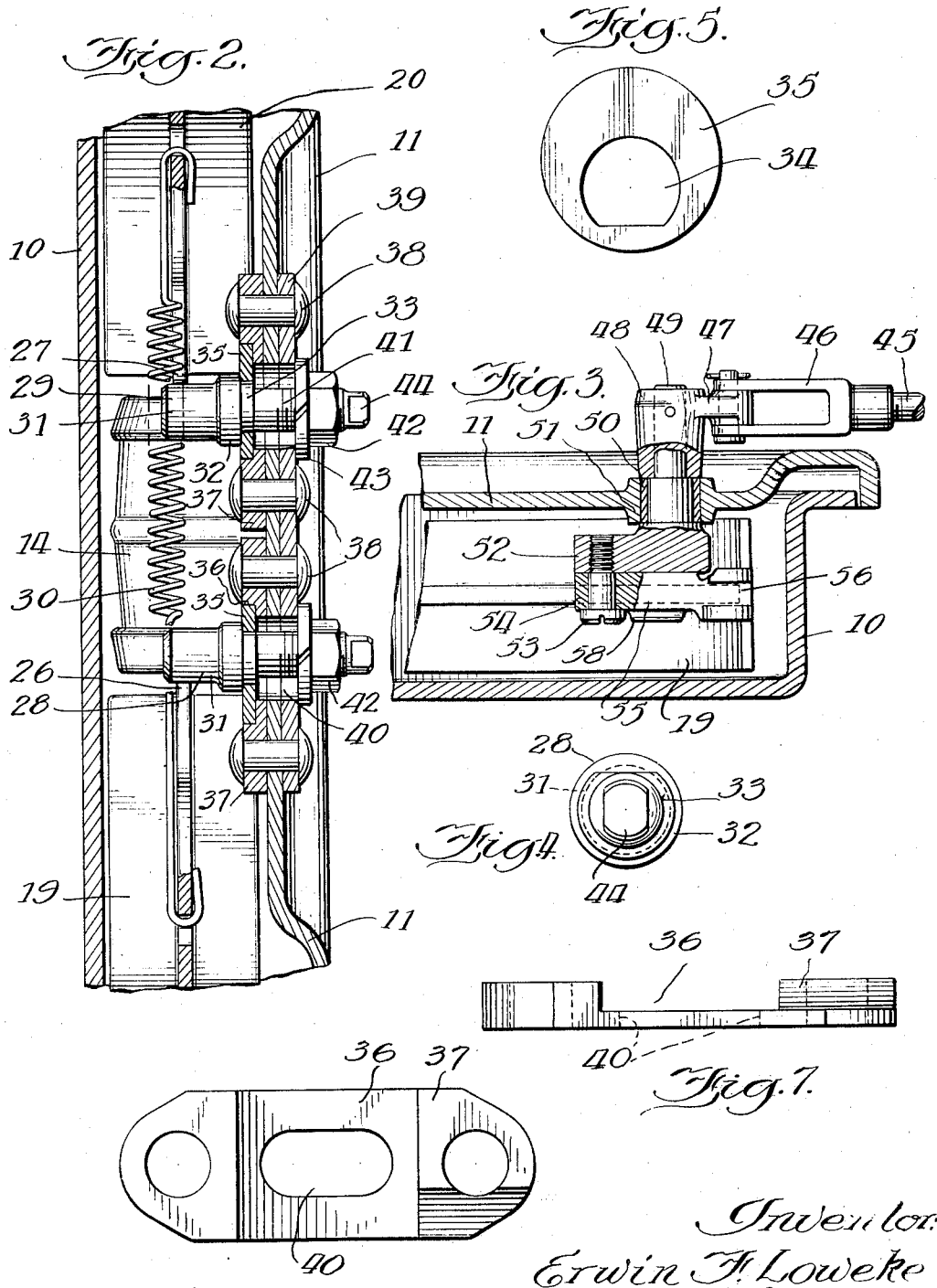

2,016,288

UNITED STATES PATENT OFFICE 2,016,288

BRAKING MECHANISM

Erwin F. Loweke, Detroit, Mich., assignor to Hydraulic Brake Company, Detroit, Mich., a corporation of California Application March 24, 1932, Serial No. 600,846

14 Claims. (Cl. 188—106)

My invention pertains to braking mechanism and is particularly concerned with the provision of an automobile brake wherein the usual foot pedal operates a hydraulic transmission for operating the brake shoes at the vehicle wheels, and wherein these same brake shoes are actuated by a mechanical linkage connected to the usual emergency brake hand lever.

In modern practice it is common to connect the foot pedal and emergency brake lever of an automotive vehicle so that both of these levers operate on the same brake shoes located at the vehicle wheels. Various attempts have been made to apply this same practice to vehicles in which the foot pedal actuates the brake shoes through a hydraulic transmission system, but such attempts have heretofore lacked commercial success because of the inefficiency of the emergency brake mechanism heretofore provided to actuate the brake shoes of an automobile having hydraulically actuated service brakes.

An object of my invention is to provide a satisfactory and efficient brake mechanism which operates the same brake shoes through a hydraulic system connected with one vehicle control lever, and a separate mechanical linkage connected with another vehicle control lever.

Another object is to provide novel anchor mechanism for the brake shoes to permit such dual operation.

Other objects and advantages will become apparent as the description proceeds.

In the drawings,

Fig. 1 is a sectional elevation of the brake mechanism located at a vehicle wheel;

Fig. 2 is a section taken on the line 2—2 of Fig. 1;

Fig. 3 is a section taken on the line 3—3 of Fig. 1;

Fig. 4 is an end view of an anchor pin;

Fig. 5 is a plan view of an anchor pin cam;

Fig. 6 is a plan view of an anchor plate; and

Fig. 7 is an elevation of the plate shown in Fig. 6.

Referring to the drawings, I have shown a brake drum 10 such as is commonly attached to the wheel of an automotive vehicle, and a brake pan 11 attached to the housing 12 which surrounds the rear axle 13 of the vehicle. Attached to the pan 11 is a double ended hydraulic cylinder 14 which may receive fluid under pressure from a master cylinder of the type disclosed in Patent No. 1,758,671, issued May 13, 1930, on an application filed by Malcolm Loughead and myself as joint inventors.

The hydraulic cylinder 14 has opposed pistons 15 and 16 which act on the ends 17 and 18 of brake shoes 19 and 20. The opposite ends of the brake shoes 19 and 20 are provided with pear-shaped openings 21 and 22 in which are located adjustable anchor pins 23 and 24 against which the brake shoes are normally held by a retractile spring 25, as shown in Fig. 1 of the drawings. The ends 17 and 18 of the brake shoes are provided with shoulders 26 and 27 which are normally held against adjustable anchor pins 28 and 29 by a second retractile spring 30.

The anchor pins 28 and 29 and their attendant mechanism are shown most clearly in Figs. 2, 4, 5, 6 and 7. Each anchor pin has a cylindrical end 31 for receiving the thrust of the brake shoe. This cylindrical surface terminates at a flange 32 immediately beyond which is located a D-shaped section 33 which fits in the D-shaped opening 34 of the anchor pin cam 35.

The D-shaped opening 34 of the cam 35 is eccentric with respect to the circular periphery of this cam which has a diameter equal to the length of the recess 36 formed in anchor plate 37 which is attached to the pan 11 by rivets 38 or any other suitable means. Preferably, although not necessarily, a second plate 39 is secured to the opposite side of the pan 11 by these same rivets 38.

As shown most clearly in Fig. 2, the cam 35 is located in the recess 36 provided in anchor plate 37 and the anchor pin extends through an elongated slot 40 formed in anchor plate 37. Corresponding elongated slots are likewise provided in the pan 11 and plate 39. As shown in the drawings, the slots in the plates 37 and 39 and pan 11 are straight slots having their major axes lying in a plane perpendicular to the planes of the shoulders formed by the ends of the recess 36. However, these slots may be made of any desired shape, the only essential being that they permit movement of the anchor pin toward and from one of said shoulders.

The anchor pin is threaded as indicated at 41 and is held in any desired position by nut 42 and washer 43. The extreme end 44 of the anchor pin is reduced and made of square configuration so that the anchor pin and cam may be readily turned to any desired position and held in this position while nut 42 is tightened. The anchor pins 23 and 24 are preferably identical with the anchor pins 28 and 29 and are adjustably mounted in the same manner.

The emergency brake lever of the vehicle is attached to a pull rod 45 provided with a yoke 46 which is adjustably threaded to the rod 45. The yoke 46 is pivotally connected to the arm 47 formed on a sleeve 48 which is non-rotatably pinned to a shaft 49 rotatably mounted in an oil-less bushing 50 carried in a thickened portion 51 of the pan 11.

An arm 52 is integral with the shaft 49 and carries a pin 53 which passes through a hole formed in the arm 54 of a three-armed lever 55. This lever 55 has an arm 56 which is slotted to receive the tapered end 57 of the brake shoe 20. The lever 55 also has a third arm 58 which is similarly slotted to receive the tapered end 59 of the brake shoe 19.

The operation of my invention is as follows:

The anchor pins are first set to give the brake shoes the desired clearance by loosening the nuts 42, rotating the anchor pins until the desired clearance is obtained, and then holding the anchor pins in such position while the nuts 42 are tightened. With the anchor pins properly adjusted the shoes are normally held in the position shown in Fig. 1 of the drawings, wherein the proper amount of clearance exists between the brake shoes and the brake drum. If, now, the operator desires to apply the brakes, he pushes down on the service brake pedal with his foot, thereby actuating a fluid compressor which forces fluid under pressure into the wheel cylinder 14. This causes separation of the pistons 15 and 16 and pivots the brake shoes about anchor pins 23 and 24 until the brake shoes engage the brake drum and create the desired retarding effect thereon. When the speed of the vehicle has been sufficiently reduced, the operator removes his foot, whereupon the retractile springs return the brake shoes to the position shown in Fig. 1.

If the driver desires to operate the emergency brake, he pulls on the emergency brake lever which, in turn, pulls the rod 45 in the direction of the arrow (Fig. 1). This, in turn, oscillates the shaft 49 and causes the pin 53 to exert a downward force on the arm 54 of the lever 55, as viewed in Fig. 1. The lever 55 is a floating lever, and this downward movement is resisted by the tapered end 59 of brake shoe 19. The result is that the lever 55 acts as a pry inserted between the ends of the two brake shoes, and the downward force exerted on the arm 54 causes the lever 55 to pry apart the ends 57 and 59 of the brake shoes, thereby causing these shoes to pivot about the anchor pins 29 and 28, respectively, until the shoes engage the drum, whereupon the desired braking effect is produced. The pear-shaped slots 21 and 22 are designed to permit such pivotal movement of the brake shoes about the anchor pins 28 and 29.

When the vehicle is traveling in the forward direction the brake drum rotates in the direction of the arrow shown in Fig. 1. It will be noted that the brake shoe 19 is thus the leading shoe during such movement, whereas the brake shoe 20 is the trailing shoe. The arrangement of my emergency brake mechanism is such that the thrust exerted on the end 59 of the brake shoe 19 must balance the thrust of the lever 55 against the end 57 of the brake shoe 20, and also the downward thrust of the pin 53 on arm 54 of this lever. The leading shoe 19 therefore receives a greater force than does the trailing shoe 20, and, since the leading shoe is far more efficient than the trailing shoe, my invention provides an extremely efficient emergency brake.

Neither operation of the foot brake alone nor operation of the hand brake alone produces a servo-braking action, but when such a servo-action is desired both the hand and foot mechanisms may be actuated simultaneously to afford a servo-braking action. Thus, when the hand lever is operated, the ends of the brake shoes 19 and 20 are moved away from their respective anchors 23 and 24 and, if the foot pedal be actuated while the brake shoes are thus held away from their anchors 23 and 24, while the vehicle is traveling in the forward direction, the force exerted on the shoe 20 by its associated hydraulic piston and by the friction of the drum will cause it to react against the floating lever 55 which in turn will multiply and transmit the force thus exerted on it to the adjacent end of the brake shoe 19, with the result that the shoe 19 will be held against its other anchor 28. In other words, the shoe 20 acts as a floating shoe whose movement with the drum is resisted by the shoe 19.

When the vehicle is traveling in the reverse direction and both the hand lever and foot lever are applied at the same time, the shoe 19 becomes the floating shoe which acts upon the shoe 20 through the floating lever 55. When this occurs the force exerted on the lever 55 by the shoe 19 is decreased before it reaches the shoe 20 because the contact point between the anchor 19 and lever 55 is closer to the pivot 53 of this lever than is the contact between the shoe 20 and the lever 55.

An important feature of my invention lies in the fact that the lever mechanism which is associated with the emergency lever control is all located at the opposite side of the drum from the hydraulic cylinder and therefore does not have to be crowded into the small space afforded between the hydraulic cylinder and the axle housing. Another feature resides in the fact that the anchor pins 28 and 29 are located radially inward of the hydraulic cylinder and are thus spaced sufficiently far from the brake drum to afford efficient emergency brake action. Another feature lies in the fact that the anchor pins 23 and 24 may be located closer to or farther from the brake drum without it interfering with the emergency brake mechanism.

While I have described only a single embodiment of my invention, it is to be understood that my invention is capable of assuming numerous forms and that the scope of my invention is limited solely by the following claims.

I claim:

1. In brake mechanism of the class described, a pair of brake shoes, a brake drum, a hydraulic cylinder for moving said shoes into engagement with said drum, anchor means for said shoes about which they pivot under the influence of said cylinder, mechanical means for causing said shoes to engage said drum, and separate anchor means independent of, and on each side of the hydraulic cylinder about which said shoes pivot under the influence of said mechanical means.

2. In brake mechanism of the class described, the combination of a brake drum, a pair of brake shoes, a hydraulic means for causing said shoes to engage said drum, a mechanical means for causing said shoes to engage said drum, said hydraulic means and said mechanical means being diametrically opposite, and anchor means for each of said two actuating means, said anchor means being independent of, and on each side of the hydraulic means and independent of, and on each side of the mechanical means.

3. In mechanism of the class described, the combination of a pair of brake shoes, each of said shoes having a slot therein, an anchor pin in each of said slots, means for pivoting said shoes about said anchor pins, and means for moving said shoes out of engagement with said anchor pins.

4. In mechanism of the class described, the combination of a brake drum, a brake shoe, said shoe having an opening therein, a pan, an anchor pin supported on said pan, said pin extending through said opening and being of smaller cross section than said opening, means for pivoting said shoe about said anchor pin and into engagement with said drum, and means for causing other relative movement between said shoe and said anchor pin.

5. In mechanism of the class described, the combination of a brake drum, a pan, a pair of brake shoes mounted on said pan, a hydraulic cylinder connected with one end of each shoe, a floating lever connected with the opposite end of each shoe, means for actuating said lever, resilient means for holding said shoes away from said drum, and stop means associated with both ends of said shoes.

6. In mechanism of the class described, the combination of a brake drum, a pan, a pair of brake shoes supported on said pan, a hydraulic cylinder attached to said pan, a pair of pistons in said cylinder, each piston adapted to actuate a brake shoe, a pair of anchor pins adjacent said cylinder and radially inward therefrom, said shoes having portions adapted to engage said anchor pins, the opposite ends of said shoes being provided with openings therethrough, anchor pins located in said openings, and means normally holding said shoes against said anchor pins.

7. In mechanism of the class described, the combination of a pan, a shoe supported thereon, an anchor pin supported by said pan, spaced shoulders supported by said pan, a cam engaging said shoulders, means holding said cam and pin in non-rotatable relation, said pin having a shoe engaging portion, and means for holding said pin and cam rigid with respect to said pan.

8. In mechanism of the class described, the combination of a pan having a slot therein, spaced shoulders at opposite ends of said slot, an adjustable anchor pin extending through said slot, eccentric means associated with said anchor pin and engaging said shoulders, said anchor pin having a concentric shoe engaging portion, means for locking said anchor pin in adjusted position, and a brake shoe carried by said pan and engaging said pin.

9. In mechanism of the class described, the combination of supporting means having a slot therethrough and shoulders normal to said slot, an adjustable anchor pin extending through said slot, an eccentric cam non-rotatably mounted on said pin, said cam engaging said shoulders, and means for locking said pin and cam against rotation relative to said supporting means.

10. In mechanism of the class described, the combination of supporting means having a slot therein and shoulders normal to said slot, adjustable anchor means extending through said slot and having an eccentric portion engaging said shoulders, said last-named means providing a concentric portion for engagement with a brake shoe, and means for holding said supporting means and anchor means in rigid relationship.

11. In brake mechanism of the class described, a pair of brake shoes, a brake drum, a hydraulic cylinder for moving said shoes into engagement with said drum, anchor means for said shoes about which they pivot under the influence of said cylinder, mechanical means for causing said shoes to engage said drum, and separate anchor means about which said shoes pivot under the influence of said mechanical means, the first said anchor means being independent of and on each side of said mechanical means.

12. In a brake of the class described, the combination of brake shoes, a brake drum, one means for applying said shoes in a non-servo manner, a second means for applying said shoes in a non-servo manner, and connections between said two means and said shoes whereby simultaneous operation of both of said means produces a servo application of said shoes.

13. In brake mechanism of the class described, the combination of brake shoes, a brake drum, hydraulic means for applying said shoes in a non-servo manner, mechanical means for applying said shoes in a non-servo manner, and connections between said shoes and said hydraulic and mechanical means whereby simultaneous operation of said hydraulic and mechanical means produces a servo application of said shoes.

14. In mechanism of the class described, the combination of a pair of brake shoes, a brake drum, a support for said shoes, anchors for said shoes, hydraulic means for pivoting each shoe about a separate anchor, mechanical means for pivoting each shoe about a separate anchor, and connections between said hydraulic and mechanical means and said shoes whereby simultaneous operation of said means pivots both shoes about a single anchor.

ERWIN F. LOWEKE.